(12) United States Patent
Venturoli et al.

(10) Patent No.: US 6,830,015 B2
(45) Date of Patent: Dec. 14, 2004

(54) METHOD AND ELECTRONIC APPARATUS FOR REVERSING THE ROTATION OF AN ENGINE

(75) Inventors: Alessandro Venturoli, Bologna (IT); Gianni Regazzi, Bologna (IT)

(73) Assignee: Ducati Energia S.p.A., Bologna (IT)

( * ) Notice: Subject to any disclaimer, the term of this patent is extended or adjusted under 35 U.S.C. 154(b) by 0 days.

(21) Appl. No.: 10/316,837

(22) Filed: Dec. 12, 2002

(65) Prior Publication Data

US 2003/0111024 A1 Jun. 19, 2003

(30) Foreign Application Priority Data

Dec. 18, 2001 (IT) .................................. MI2001A002670

(51) Int. Cl.[7] ............................................. F01L 13/02
(52) U.S. Cl. ....................................... 123/41 E; 123/617
(58) Field of Search .............................. 123/41 E, 617

(56) References Cited

U.S. PATENT DOCUMENTS

| | | | |
|---|---|---|---|
| 4,237,844 A | * | 12/1980 | Lathlaen ..................... 123/617 |
| 5,036,802 A | | 8/1991 | D'Amours |
| 5,782,210 A | * | 7/1998 | Venturoli et al. ......... 123/41 E |
| 5,794,574 A | * | 8/1998 | Bostelmann et al. ..... 123/41 E |

* cited by examiner

Primary Examiner—Noah P. Kamen
(74) Attorney, Agent, or Firm—Young & Thompson (57) ABSTRACT

A method and an electronic apparatus for reversing the rotation of a two-stroke internal combustion engine, provided with an ignition system powered by a permanent magnet voltage generator. The electronic apparatus comprises a microprocessor control unit programmed for controlling the sparking both during forward and backward rotations, and for controlling the reversal rotation procedure of the engine. The reversal procedure is controlled on the basis of information obtained from a first binary signal emitted by a bistable magnetic sensor activated by the magnetic flux of the generator, and from a second binary signal correlated to the polarities of output voltage of the voltage generator. The original forward or backward rotation is made to reverse by providing a sparking delay, and subsequently generating an advanced spark while the engine is still rotating in the original direction.

23 Claims, 7 Drawing Sheets

METHOD AND ELECTRONIC APPARATUS FOR REVERSING THE ROTATION OF AN ENGINE

BACKGROUND OF THE INVENTION

This invention refers to a method for reversing the rotation and to an electronic apparatus for controlling the ignition of an internal combustion engine of two-stroke type, and in particular relates to a microprocessor-controlled electronic apparatus for reversing the rotation of engines, both of single-cylinder and two-cylinder type, obtaining the necessary information on the phase and the rotational direction of the engine by using a particular magnetic sensor and the same voltage generator which powers the ignition circuit of the engine. The invention can be used for reversing the rotation in engines for snowcats, small vehicles, aquascooters and in all those applications which call for a controlled reversal of the rotation of a two-stroke engine.

Mechanical systems or electric and electronic devices of varying complexity have been variously proposed to control the reversal of a two-stroke internal combustion engine.

In particular, U.S. Pat. Nos. 5,036,802, 5,782,210 and 5,794,574, show a number of devices for reversal of the rotation of an engine, comprising a microprocessor appropriately programmed for monitoring the speed and direction of rotation of the engine, as well as for managing the ignition of the engine, both during its forward rotation and during its reverse rotation, on the basis of information obtained by sampling the output of a voltage generator, or on the basis of pulse signals, separate from the voltage signals of the generator, supplied by a pair of inductive triggers suitably out of phase to provide the control microprocessor with information relating to the direction, speed of rotation and phase of the engine.

In general, the previously known reversing devices require complex, costly electronic solutions which are somewhat unreliable or in any case difficult to set when the reversal must be carried out at very low speeds of rotation; in particular, in the previously known rotation reversing devices, the ignition must be deactivated beforehand to cause the engine to slow down and the pulse signals are generated by usual magnetic detectors of inductive type, which have the capacity to sense the variation in the magnetic flux generated by them, caused by the passage of a tooth provided on the peripheral surface of the rotor of the voltage generator which normally powers the ignition of the engine.

It is also known that in the sensors operating by this principle, each variation in the magnetic flux gives rise to the generation of an electric pulse having a polarity corresponding to a positive or a negative variation of the magnetic flux; that is to say, a positive and, respectively, a negative signal depending on whether the tooth is entering or leaving the magnetic field of the sensor, regardless of the direction of rotation. Hence, by using a single sensor of this type it is not possible to know the rotational direction of the engine under all the conditions which in practice may exist at the time of reversal; in fact if the reversal time coincides with an intermediate position of the tooth, with respect to the axis of the sensor, that is to say when the tooth has already magnetically engaged the sensor, the latter will in any case emit two signals of opposing polarities, likewise to the case in which the tooth continues its forward rotation, thereby making it impossible to recognize the direction of rotation and to efficiently control the ignition of the engine.

In the electronic control of the reversal of rotation of an engine it is also necessary to be fully acquainted with the angular position of the engine in relation to the thermal cycle, in that it is essential data not only for controlling the ignition in both rotational directions of the engine, but also for controlling the entire reversal process and the subsequent reattempts in the event of a failed one.

In the devices described in the previous patents, the amplitude of the pulse generated by the inductive type sensors is proportional, as is known, to the derivative of the magnetic flux, that is to say, depending upon the speed at which the tooth enters and, respectively, leaves the magnetic field of the sensor; hence, for low speeds of rotation the amplitude of the pulse generated may sometimes prove to be too low to enable it to be recognized by the control unit, precisely as a result of an attempt at reversal which, as is obvious, involves a time instant in which the speed is zero.

Considering that the aforementioned devices refer precisely to these pulses to obtain information on the phase and direction of rotation of the engine, this can be considered as their critical state.

Consequently, the inductive type sensors normally used in control devices for reversal of the rotation of an internal combustion engine described in the aforementioned patents, are extremely difficult to set in order to obtain a reliable reversal procedure, and are structurally complex and expensive due to the need to use several sensors of a relatively high cost.

OBJECTS OF THE INVENTION

The main object of this invention is to provide a method and an electronic apparatus for reversal of the rotation of a two-stroke internal combustion engine, and for controlling the ignition, whereby it is possible to have a high degree of certainty in recognizing both the angular position and the direction of rotation of the engine, regardless of the forward or rearward direction of rotation and the speed of rotation of the same engine, and which ensures a high degree of reliability of the reversing procedure.

A still further object of the invention is to provide a method and an electronic apparatus of the abovementioned type, whereby it is possible to recognize whether an attempt to reverse the rotation of the engine has been successful or has failed, and in this latter case enabling a subsequent attempt or more attempts to be made.

A still further object of the invention is to provide an apparatus for reversal of the rotation of an engine and for controlling the respective ignition system which, in addition to being more highly reliable, is also structurally simple and relatively reduced in cost.

BRIEF DESCRIPTION OF THE INVENTION

According to a first aspect of the invention, a method has been provided for reversing the rotation of a two-stoke internal combustion engine having a voltage generator to generate an alternate voltage having different polarities for an ignition circuit, and an electronic control apparatus comprising a micro-processor control unit for controlling the alternate voltage supplied to said ignition circuit, in which the reversal of rotation is performed after a reduction of the rotational speed of the engine, comprising the steps of:

- providing said control apparatus with a bistable sensor having first and second conductive states, and cyclically switching the sensor between said first and second states during the rotation of the engine;
- generating a first binary signal having first and second operative levels correlated to said first and second conductive states of the bistable sensor;
- generating a second binary signal having first and second operative levels correlated to the polarities of the alternate voltage supplied to the ignition circuit;
- detecting speed and direction of rotation of the engine, on the basis of information obtained by the microprocessor control unit from said first and second binary signals;
- slowing down the speed of rotation of the engine while it is still rotating in the detected direction, by delaying the sparking of the ignition circuit with respect to a top dead centre of the engine; and
- effecting the reversal of the rotation by sparking in advance with respect to said top dead centre of the engine.

According to further feature of the invention, an electronic apparatus is provided for reversing the rotation of a two-stroke internal combustion engine having at least one two-stroke cylinder-piston unit, comprising:

- an engine ignition circuit;
- a voltage generator having a permanent magnet rotor and a stator provided with a winding for generating an alternate voltage for powering the ignition circuit;
- means for supplying phase signals correlated to the direction and speed of rotation of the engine; and
- a microprocessor control unit, for controlling the phases of the ignition circuit and for effecting a reversal of rotation of the engine, the apparatus comprising:

- a bistable sensor having first and second conductive states, said bistable sensor being cyclically activable during the rotation of the engine for the generation of a first binary signal correlated to said first and second conductive states;
- a circuit for generating a second binary signal correlated to the polarities of the alternate voltage for the ignition circuit;
- the microprocessor control unit comprising signal inlets fed with said first and second binary signals, said control unit being programmed for determining speed and direction of rotation of the engine, and for controlling the ignition of the engine, during forward and reverse rotation, and for slowing down and reversing the rotation of the engine, on the basis of information obtained from said first and second binary signals.

According to a particular embodiment of the invention, the bistable magnetic sensor is positioned close to a peripheral wall of the rotor of the voltage generator to be cyclically subjected to magnetic pulses for switching over its states, provided by flux circulation means on the peripheral surface of the rotor, to obtain a binary signal having positive and negative front sides appropriately out of phase with respective to the top dead centre of a piston of the engine.

The magnetic sensor preferably comprises a bistable Hall-effect probe, with a suitable magnetic circuit optimized for sensing the magnetic flux which flows from appropriate apertures in the peripheral wall of the rotor of the voltage generator; in order to maintain a high degree of precision at switching time of the sensor, and at the same time ensuring a satisfactory sensitivity, said apertures for the passage of the flux extend in the axial direction of the rotor.

The holes for the passage of the flux must be in such positions that the axes of at least two consecutive holes are always facing the axes of magnetic poles of the voltage generator, having opposite polarities, at an angular distance correlated to the position identified by the top dead centre of the piston or pistons of the engine.

More in particular, by referring to the angular position of the rotor corresponding to the dead centre of one piston of the engine, the two apertures which allow the activation of the sensor will be disposed symmetrically with respect to the position of the sensor itself, at an angular distance ranging approximately from 40° to 60°, so that the changeovers in the conductive state of the magnetic sensor and of the binary signal occur in positions which are symmetrical with respect to the position identified by the top dead centre of the piston, representing sufficiently advanced events with respect to the dead centre in both directions of rotation, thereby allowing control of the ignition by actuating even high advance angles in both directions of rotation.

According to a further aspect of the invention, the magnetic sensor is connected to the microprocessor of the control unit by means of an interface comprising a voltage comparator capable of supplying said first binary signal in relation to the state assumed by the bistable magnetic probe; the same line which supplies the control unit with information on the state of the magnetic probe is also used for supplying power to the probe itself.

According to a further feature of the invention, the axes of the magnetic poles of the stator of the voltage generator are be positioned in such a way that the zero crossing of the alternate voltage supplied by the same generator, corresponds to the angular positions of the magnetic poles of the rotor identified by the top dead centre or centres of the engine.

According to the invention, after a reversing control has been operated by a driver of the vehicle or a user, the engine is slowed down by controlling the ignition with a suitable ignition delay with respect to the top dead centre, by an appropriate deceleration law programmed and controlled by the microprocessor, acting upon the extent of such delay; when the engine has reached a pre-established optimal speed of rotation, a spark is generated for a suitably and amply advanced ignition with respect to the top dead centre, aimed at reversing the movement of the drive shaft before the involved piston reaches its top dead centre, and then controlling the ignition with a usual optimal advance to allow the engine to continue to rotate in the opposite direction.

The apparatus is capable of sensing the outcome of a reversing attempt thanks to the processing, by the control unit, of the signals provided by the bistable magnetic sensor and by the voltage generator, and is consequently capable of controlling any subsequent attempts, and if necessary of abandoning the reversing process, resuming the normal control of the advance whenever certain conditions occur, such as for example the failure of a certain number of attempts.

Furthermore, according to the invention, the command for reversal of the engine by the user is transmitted to the control unit through an interface designed to control all the inputs and outputs interacting with the user, said interface being connected to the ignition control unit by means of a serial communication channel.

BRIEF DESCRIPTION OF THE DRAWINGS

The invention will be described hereunder in greater detail with reference to the examples of the accompanying drawings, in which.

DETAILED DESCRIPTION OF THE INVENTION

A description is given hereunder of a preferential embodiment of the apparatus and the method for reversing the rotation of a two-stroke internal combustion engine, according to the invention.

In general the invention can be applied to any internal combustion engine, with one or more cylinders of a two-stroke type; however, the invention is described hereunder with special reference to a two-cylinder engine, with timing at 180°.

Figure 1:
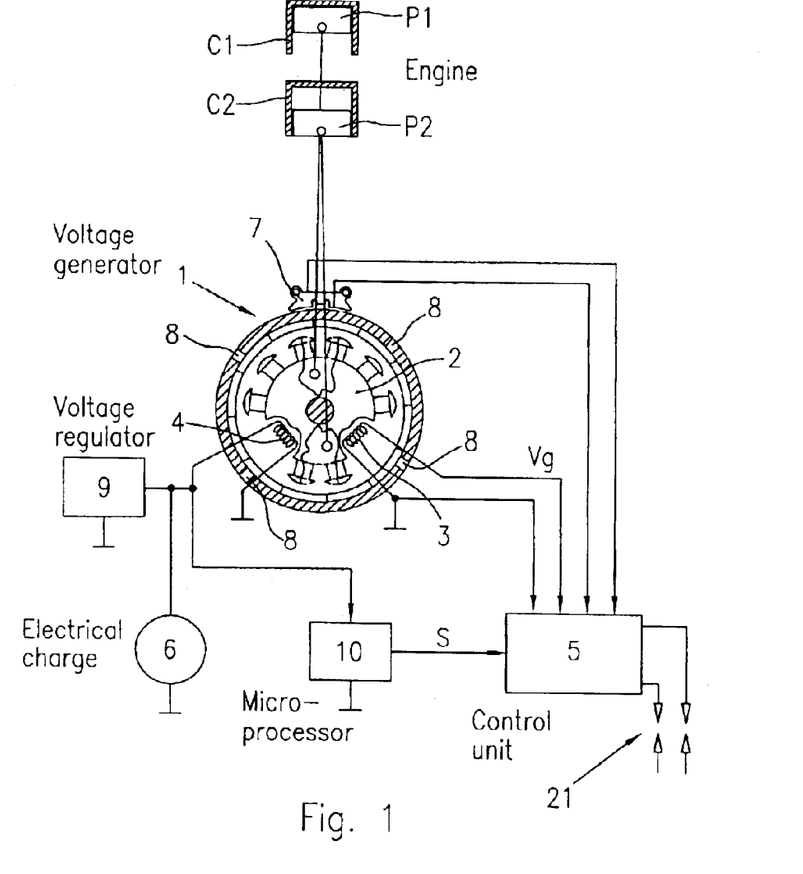
FIG. 1 shows a block diagram illustrating a two-stroke two-cylinder engine and an electronic control unit according to the invention.

With reference to the diagram of FIG. 1, reference 1 has been used to indicate the flywheel rotor of a permanent magnet voltage generator having a twelve poles stator 2, provided with two stator windings 3 and 4 respectively designed, the first one 3 for supplying power to an electronic control unit 5 for controlling the ignition system, and the second one 4 for supplying power to the lighting system and the auxiliary equipment 6.

For simplicity of the drawing, the stator windings 3 and 4 are schematically shown separate from the stator 2.

The engine in turn comprises a first piston P1 within the cylinder C1, and a second piston P2 within the cylinder C2, which are mechanically connected in a per se known way in opposite positions to a crankshaft of the engine, which in turn is operatively connected to the rotor 1 of the voltage generator, as schematically shown.

The apparatus of FIG. 1 also comprises a bistable sensor 7, defined further on, positioned in such a way as to face the peripheral wall of the rotor 1, so that the magnetic field from the permanent magnets of the rotor, radially polarized with opposite N and S polarities, activate the same sensor 7 in synchronism with the rotation of the engine, only when the flux generated by the magnets can cross and bias the probe 7 through appropriate apertures 8, which are provided in the cap of ferromagnetic material of the rotor 1 for deviating the flux.

The block 9 in FIG. 1 identifies an alternate voltage regulator designed to regulate the voltage produced by the stator winding 4 for supplying power for the loads intended for the lighting or for other auxiliary functions, as a whole represented in FIG. 1 by the block 6.

FIG. 1 also shows a block 10 which represents a microprocessor unit for controlling the inputs and the outputs of the apparatus, which allow the driver of the vehicle or the user of the engine to interact with the system.

As mentioned previously, the apparatus according to this invention contemplates the use of a single bistable sensor 7, for solving the problem of achieving a digital control ignition system powered by a voltage generator, capable of accomplishing the reversal of the direction of rotation of the engine while maintaining the maximum degree of control and knowledge of the angular position, the speed of the engine and its direction of rotation.

For the purposes of this description, the expression "bistable sensor" is intended to indicate any type of magnetic or other type of sensor, sensitive to the biasing of two different kinds, for example of opposite polarities or signs, or of different levels, which is capable of modifying and maintaining its own state and, consequently, also the output signal associated with it in one of the two possible configurations, in relation to the biasing that has been exerted on the sensor itself.

Another characteristic that the sensor in question must satisfy to attain the indicated targets is that a certain angular position of the drive shaft of the engine, and consequently of the rotor connected thereto, must correspond with a same type of bias of the sensor, regardless of the direction of rotation of the engine.

Figure 2:
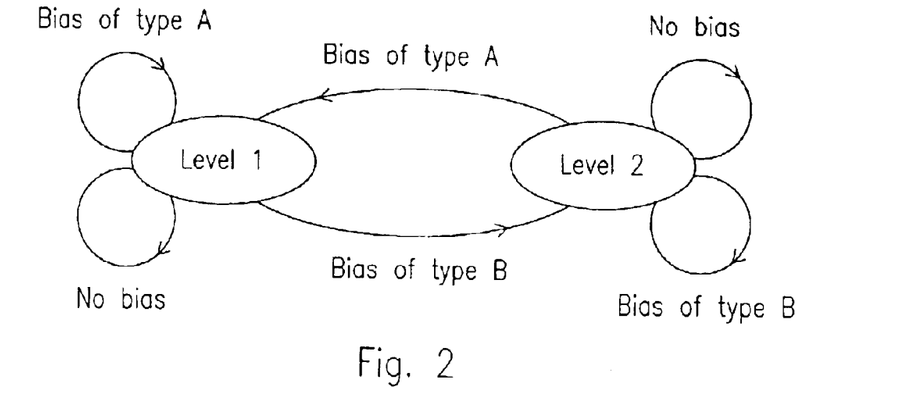
FIG. 2 shows a diagram indicating the operative mode of the bistable sensor used in the electronic apparatus according to the invention.

The state diagram shown in FIG. 2 is a schematic representation of the functional characteristic of this type of sensor, in which by "level 1" and "level 2" are indicated the possible states that can be assumed by the output of the sensor, and by "A-type bias" and "B-type bias" the possible biasing that can be sensed by the sensor; its behavior can be described as follows:

A-type bias: when the sensor detects this type of bias, for example in the case illustrated, it senses the presence of a South magnetic pole through an aperture 8 in the rotor, if the state of the output is at level 1, the state of the output will remain at level 1, whereas if the state of the output is at level 2, the state will be switched to level 1.

B-type bias: when the sensor detects this type of bias opposite to the previous type, for example in the case illustrated, it senses the presence of a North magnetic pole through an aperture 10 in the rotor; if the state of the output is at level 2, the state of the output will remain at level 2, while if the state of the output is at level 1, the state will be switched to level 2.

In the absence of both types of bias, the output of the sensor remains in the current state, that is to say no switching from one level to another occurs.

Figure 3:
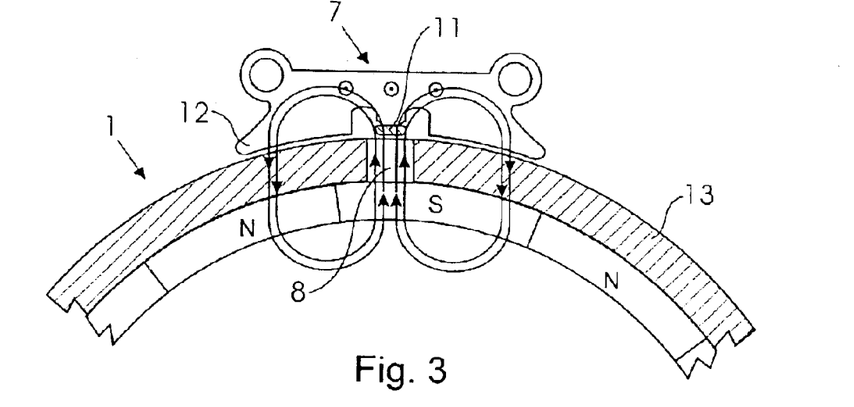
FIGS. 3, 4 and 5 show diagrams illustrating the implementation of said bistable sensor using a bistable Hall-effect probe, in three different biasing conditions.
Figure 4:
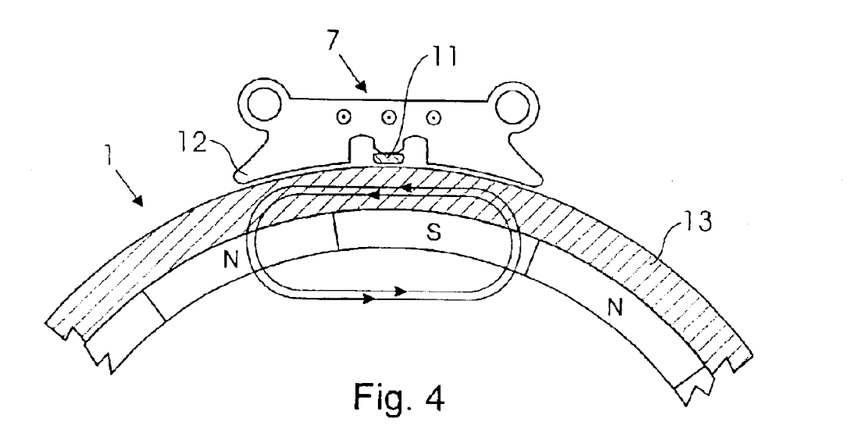
Figure 5:
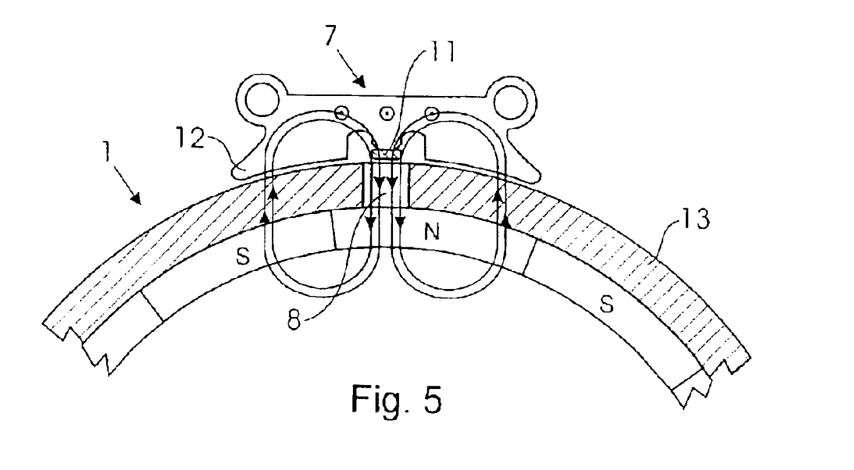

In the following description reference will therefore be made, purely by way of example, to a magnetic sensor achieved by using a bistable Hall-effect probe whose sensitive element 11 (FIGS. from 3 to 5) is fitted on a suitable yoke 12 of ferromagnetic material, having three pole pieces which follow one another angularly, facing the peripheral wall 13 of the rotor 1; the yoke 12 is secured to the body of the engine, as is the stator 2 of the generator, and is capable of sensing the magnetic flux of the rotor 1 which exits from suitable apertures 8 in the cylindrical wall 13 of the rotor 1; the apertures 8 are preferably in the form of elongated holes in the direction of the rotational axis of the rotor.

Referring to the previous description, and to the FIGS. 3, 4 and 5, it can be observed that when the sensitive element 11 of the Hall probe is facing an area of the peripheral surface 13 of a cup-shaped rotor 1 which is devoid of holes 8, as in FIG. 4, it gives rise to the condition indicated in FIG. 2 by "absence of bias", in that the flux generated by the N and S magnets of the rotor circulates through the peripheral wall 13 of the rotor itself.

When, as in FIG. 3, the axis of an aperture 8 positioned in correspondence with the pole of one of the N and S magnets of the rotor polarized radially in one direction, for example the S magnet, is close to the axis of the sensor 7, coinciding with the axis of the sensitive element of the Hall probe, it gives rise to the condition conventionally indicated in FIG. 2 as "A-type bias".

Lastly, as shown in FIG. 5, when the axis of an aperture 8 positioned in correspondence with one of the magnets of the rotor polarized radially in the direction opposite the previous one, for example the N magnet, is close to the axis of the sensor 7, it gives rise to the condition conventionally indicated in FIG. 2 as "B-type bias".

Figure 6:
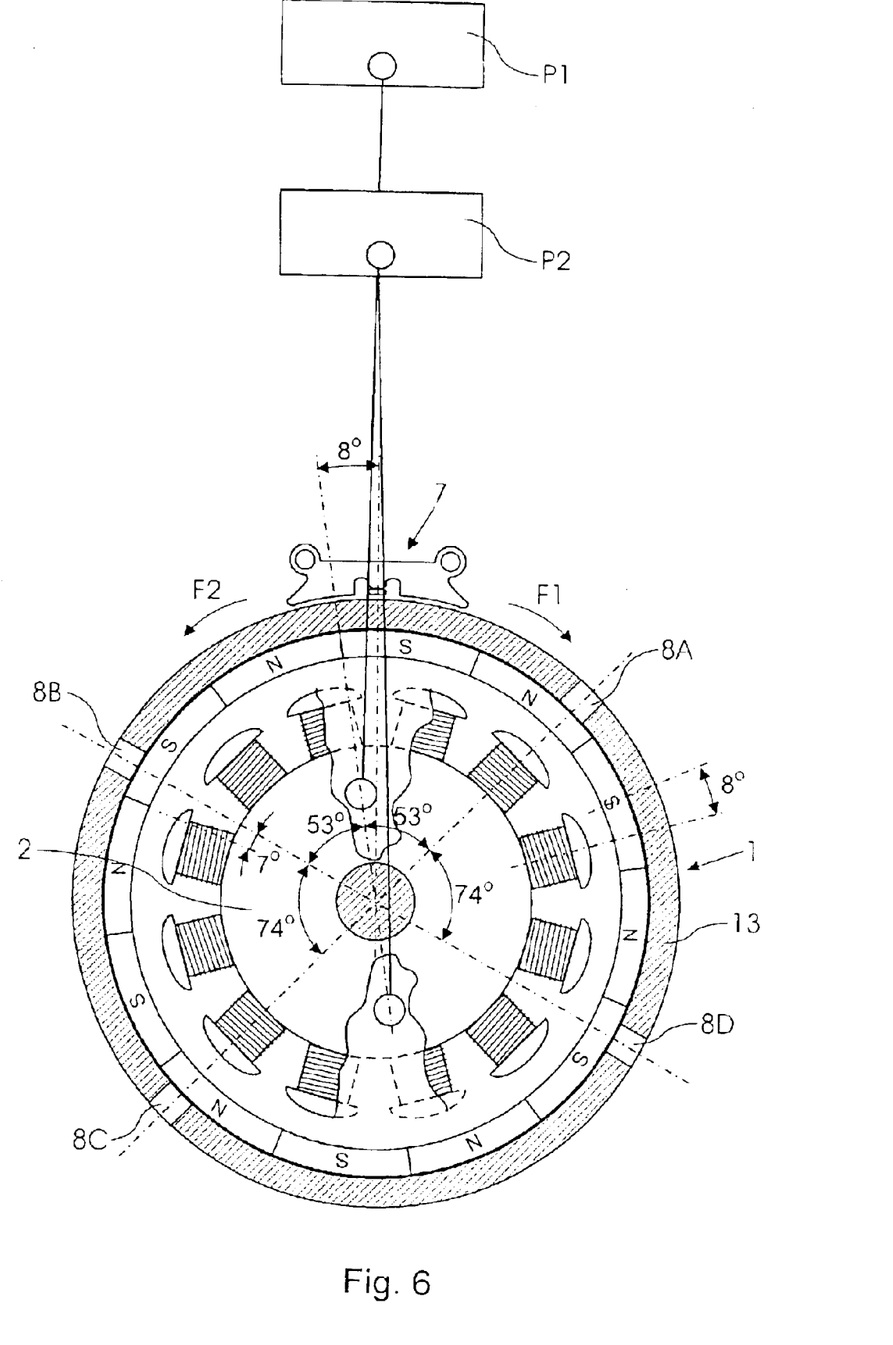
FIG. 6 shows an enlarged cross-sectional view of a permanent magnet voltage generator, in its stator and rotor components, and of the bistable magnetic sensor, in which the significative reference axes for the functioning of the apparatus according to the invention have been shown.

In the event of application in a two-stroke, two-cylinder engine, at 180°, as schematically indicated in FIG. 6, four apertures 8A, 8B, 8C and 8D are made, angularly spaced apart from one another as illustrated in FIG. 6, where the position of the rotor 1 is represented as corresponding to a displacement of 8° with respect to the position assumed by the rotor in correspondence with the top dead centre of the piston P1.

FIG. 6 also shows the position of the stator 2 for univocally defining the phase of the signal transmitted by the stator winding 3 which supplies power to the ignition, with respect to the output signal of the sensor 7 and with respect to the top dead centre (TDC) position of the pistons P1 and P2.

It can be seen that when the piston P1 reaches its TDC, that is to say when the drive shaft and the rotor connected to it are rotated in a clockwise direction by 8° with respect to the position indicated in FIG. 6, the sensor 7 will be exactly in the middle of the arc between the holes 8A and 8B, and the spokes or polar extensions of the stator 2 will be aligned with the axes of the N and S magnets of the rotor; in FIG. 6 the rotor is shown shifted by 8° in an anticlockwise direction with respect to this situation, to prevent the axes of the connecting rods from coinciding with those of the cylinders and jeopardizing the readability of the drawing.

Because of this situation, in correspondence with the top dead centre a corresponding condition of maximum magnetic flux occurs through the stator windings, and consequently also a passage for the zero crossing of the voltage generated in the stator windings.

Figure 7:
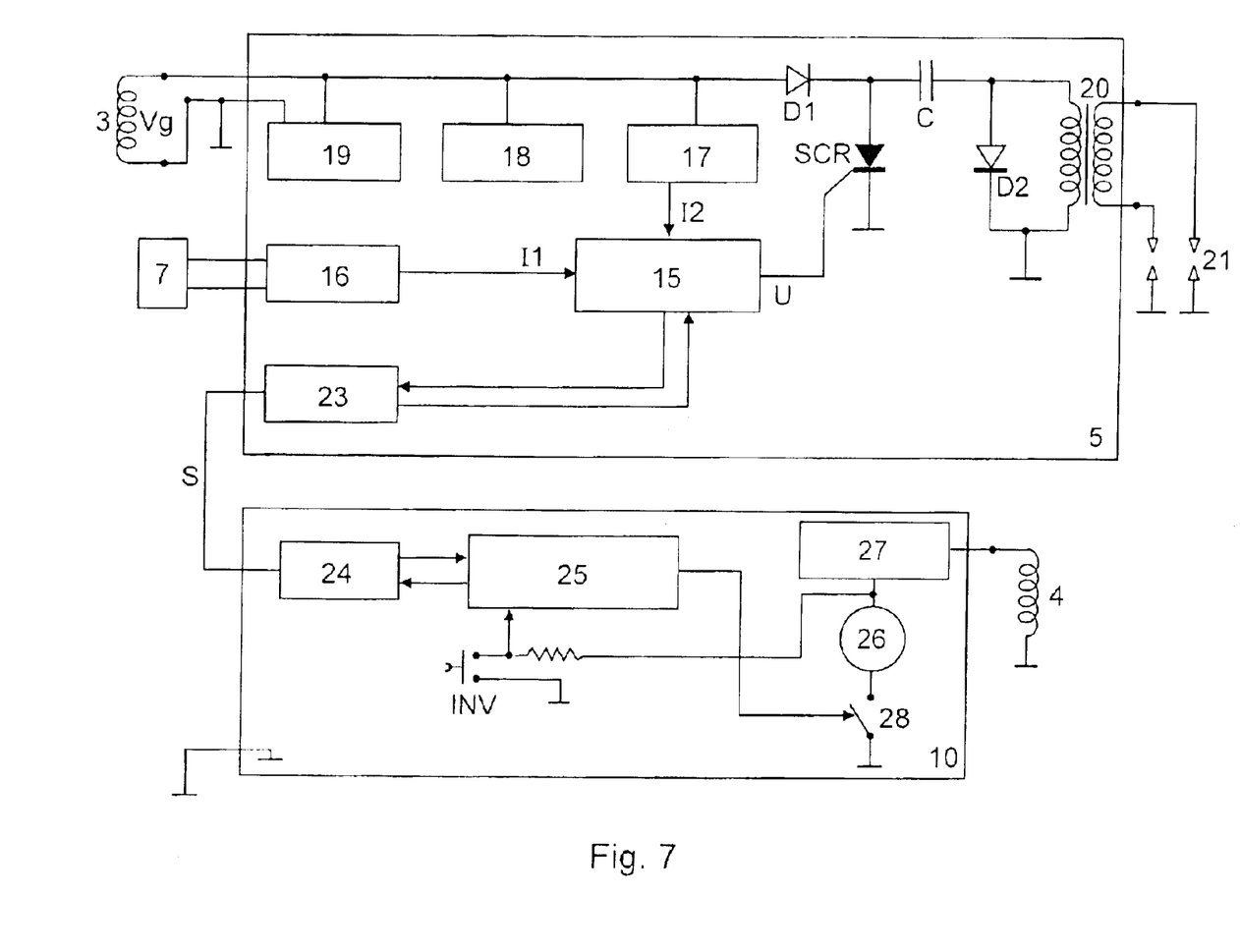
FIG. 7 shows a block diagram of the ignition control unit according to the invention.

Disposed inside the control unit 5 is a specific circuit 62 capable of generating a binary signal correlated to the polarity of the alternate voltage Vg for powering the ignition circuit, generated by the stator winding 3 as described further on with reference to FIG. 7.

The symmetrical disposition of the two holes 8A and 8B and respectively 8C and 8D with respect to the axis of the sensor 7, in the top dead centre conditions, is advantageous in that it makes it possible to generate two types of biases which can always be correlated with the voltage Vg of the generator for obtaining information on the phase and on the direction of rotation of the engine, within a substantially symmetrical framework in which it is easy to control the ignition phase in both directions, making reference to a single sensor. This greatly simplifies the apparatus, increases its operating reliability and substantially reduces its manufacturing costs.

Figure 8:
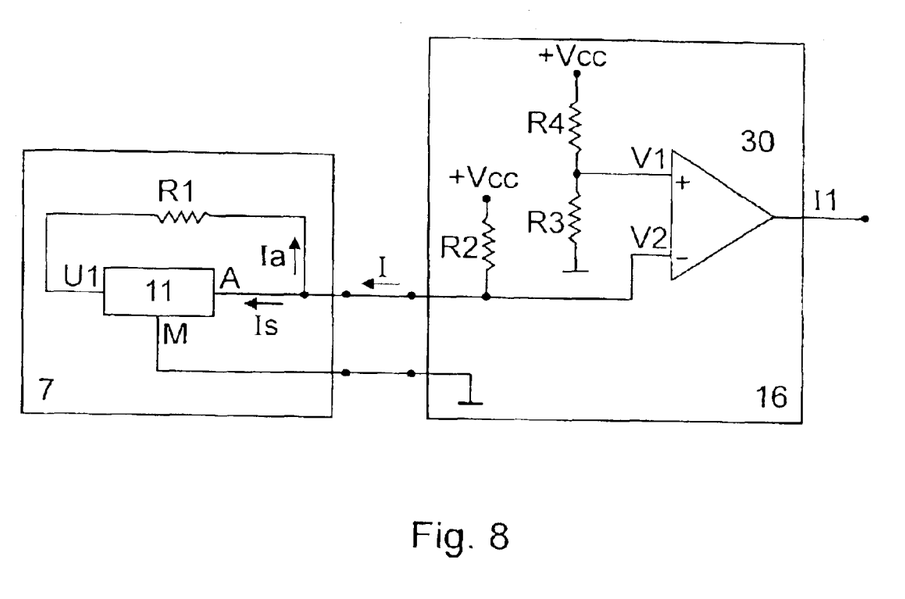
FIG. 8 shows the wiring diagram of the bistable Hall-effect magnetic sensor, at a stage in which it supplies power to the probe and simultaneously transmits information to the control unit on the state of the probe, using a single connection.

With reference to FIGS. 7 and 8 a more detailed description will now be given of the block diagram of the microprocessor-controlled ignition control unit 5 constituting part of the apparatus according to the invention.

As shown in FIG. 7, the control unit 5 comprises a microprocessor 15 supplied at one of its inputs with a first binary signal I1 from an input stage 16 connected to the magnetic sensor 7.

A second input of the microprocessor 15 receives a second binary signal I2 supplied by a further input stage 17 which has the function of provide a binary signal correlated to the polarities of the alternate voltage Vg powering the ignition, supplied by the stator winding 3.

Reference 18 in FIG. 7 indicates a booster or step-up transformer, while reference 19 indicates a feeder circuit for feeding the various functional blocks.

The output U of the microprocessor 15, is sent to the control electrode of an electronic switch SCR constituting part of a conventional ignition circuit comprising the capacitor C connected to the winding 3 through the diode D1, the coil 20, for the discharge in the sparking plugs 21, and the re-circulating diode D2; consequently the ignition circuit can be activated or deactivated by the microprocessor 15 in an appropriately programmed way to control the ignition of the engine both during the conditions of normal rotation or forward rotation, and during reversal of the rotation, as well as during the rotation in the reverse direction of the engine. The case in FIG. 7 shows, by way of example, a capacitive type ignition.

FIG. 7 also shows the block 10 for the interface with the driver of the motor vehicle or user, which has the task of controlling all the inputs and outputs of the functions which involve the driver of the vehicle. References 23 and 24 indicate the circuits by means of which the microprocessor 15 of the ignition control unit 5 and the micro-controller 25 of the interface block 10, gain access to the communications channel achieved by the serial connection S.

In particular, the micro-controller 25 is programmed to sense when the driver operates the reversing button indicated by INV, and to send an appropriate message to the ignition control unit 5 to actuate the start-up of the reversal procedure.

Whenever, after being commanded to reverse, the engine is proceeding in the reverse direction, such change of state is communicated by the microprocessor 15 to the micro-controller 25 of the interface 10, always by means of the serial line S; in this case the micro-controller 25, activates an optical or acoustic indicator 26 to inform the driver that the vehicle is ready to proceed in the reverse direction to the normal direction, in other words that the procedure for reversal of the rotation of the engine has been started.

Also indicated in the interface 10 is the functional block 27 which represents a circuit for supplying power to the device itself capable of drawing the necessary energy from the winding 4 which supplies power to the lighting system and the auxiliary equipment 6.

This solution may appear to be a complication as compared to a system which directly controls, after direct connection to the unit 5, a reversing button and an acoustic or optical indicator.

In actual fact, the cabling simplification of the overall system, and the possibility of supplying power to any acoustic and optical indicators using the alternate current of the stator winding 4 intended for the lighting system and the auxiliary equipment, makes this solution competitive also from the point of view of costs, especially when the reversal function of the engine is fitted in an ignition system which is already provided with other inputs or outputs respectively controlled by or intended for the driver of the vehicle. By way of example, we can mention functions of diagnosing the sensor components of the system, switches whereby it is possible to select particular operating modes of the system, inputs or outputs correlated to antitheft functions integrated into the system.

FIG. 8 shows the circuit of the bistable magnetic sensor 7, composed of a bistable Hall probe and of the electronic components whereby it is possible to obtain from the probe itself the binary signal I1 destined for the microprocessor 15 and simultaneously supply power to the probe 7 by means of a single connection, in addition to that of the earth connection.

It can be seen, in fact, that in itself the sensitive element 11 which constitutes the core of the sensor 7 heretofore referred to as "bistable Hall probe" is provided with three contacts destined respectively for the power supply E, the earth connection M and the output U1. The behavior of these elements sensitive to a magnetic field, referred to by various manufacturers as "bipolar switches" or "digital position sensors" or "accuracy Hall-effect latches" is that of having two stable states which correspond respectively to a low and a high impedance to earth of the output contact, and in this sense are also referred to as "switches", and of switching between these two states when biased by a magnetic field with a certain polarity and over a certain threshold of intensity.

According to a particular feature of this invention, a single conductor is used both for supplying power to the magnetic sensor and for obtaining its output signal.

In this connection, the contact E for powering the Hall probe 11 is connected, by means of appropriate cabling and a resistance R2, to a source of direct voltage Vcc supplied by the block 19 in FIG. 7.

In the same figure it can also be seen that, disposed between the output U1 and the input E supplying power to the Hall probe 11, is a parallel circuit comprising a resistor R1 designed to allow the circulation of a current Ia through the probe when its output U1 is in one of the contemplated states, in particular in the state corresponding to a low impedance of the contact M to earth.

The voltage V2 which represents the division of the voltage Vcc with respect to R2 and to the equivalent impedance of the probe 11 to earth, is also provided at the negative input of a voltage comparator 30, whose positive input is provided with a reference voltage U1 resulting from a division of the voltage Vcc defined by the resistances R3 and R4.

The voltage comparator 30 in turn supplies a signal I1 at its output in the form of a binary signal which is then supplied to a corresponding input of the microprocessor 15 in FIG. 7.

The operating principle on which the circuit of FIG. 8 is based can be described as follows: the resistors R1, R2, R3 and R4 are dimensioned in such a way that when the sensitive element 11 of the Hall probe is in its low impedance state, the voltage V2 present at the negative input of the voltage comparator, equivalent to Vcc−I×R2 with I equal to the current Is feeding the probe, added to the current Ia absorbed by the output U1 of the probe through R1, is lower than the voltage V1 which invariably assumes the value given by the expression Vcc×R3/(R3+R4); this obviously leads to a "high" value of the output I1 of the voltage comparator 30. Conversely, when the sensitive element 11 is in its high impedance state, the current I is composed only of the current Is for feeding the probe, giving rise to a V2 higher than V1 and, consequently, a low value of the output I1.

Figure 9:
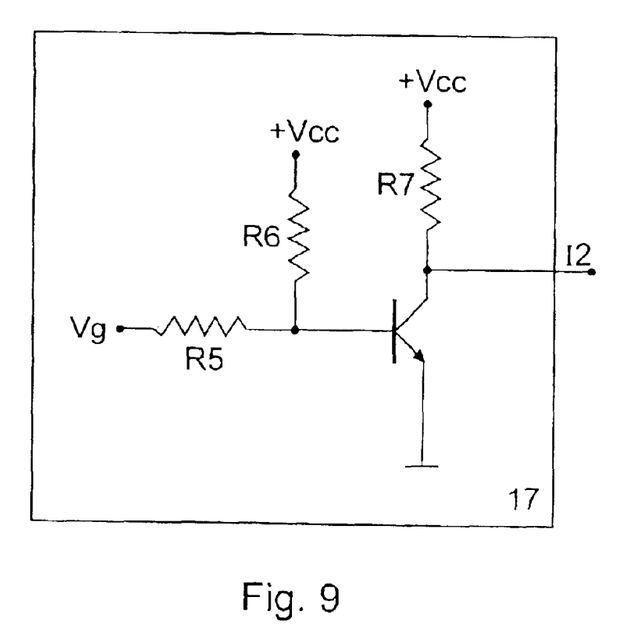
FIG. 9 shows a possible solution of the block designed to supply a binary signal correlated to the voltage of the generator.

With reference to FIG. 9 a description is given hereunder of a possible embodiment of the block 17 of FIG. 7 which has the function of providing the binary signal I2 correlated to the polarity of the alternate voltage Vg generated by the winding 3 for supplying power to the ignition.

As shown in FIG. 9 the block 17 comprises a transistor whose base is polarized by means of the resistor R5 with the voltage Vg coming from the winding 3 of the voltage generator, and respectively with a constant voltage which represents a division of the voltage Vcc supplied by a resistor R6. In turn, the collector-emitter circuit of the transistor TR is connected to the circuit 19 for supplying power to the various functional blocks, by means of the resistor for division of the input voltage Vcc, respectively earthed; in this way, at the output of the block 17 a binary signal I2 is supplied whose phase is correlated to that of the voltage Vg of the generator.

The operating mode of the described apparatus, both in the case of the normal operation of the engine, that is to say with forward rotation, and in the case of its operation with reversed rotation, will be described hereunder with reference to the graphs of FIGS. 10 and 11. These diagrams show the evolutions of the signals I1 associated with the state of the bistable magnetic probe 7, and I2 associated with the voltage Vg for supplying power to the ignition circuit as the angular position α of the drive shaft evolves with respect to the timing case, in both directions of rotation.

The speed of rotation of the engine, as well as events univocally determining the angular position of the rotor 1 capable of enabling suitable digital control of the ignition in both directions of rotation, can be determined by using the binary signals I1 and I2.

Figure 10:
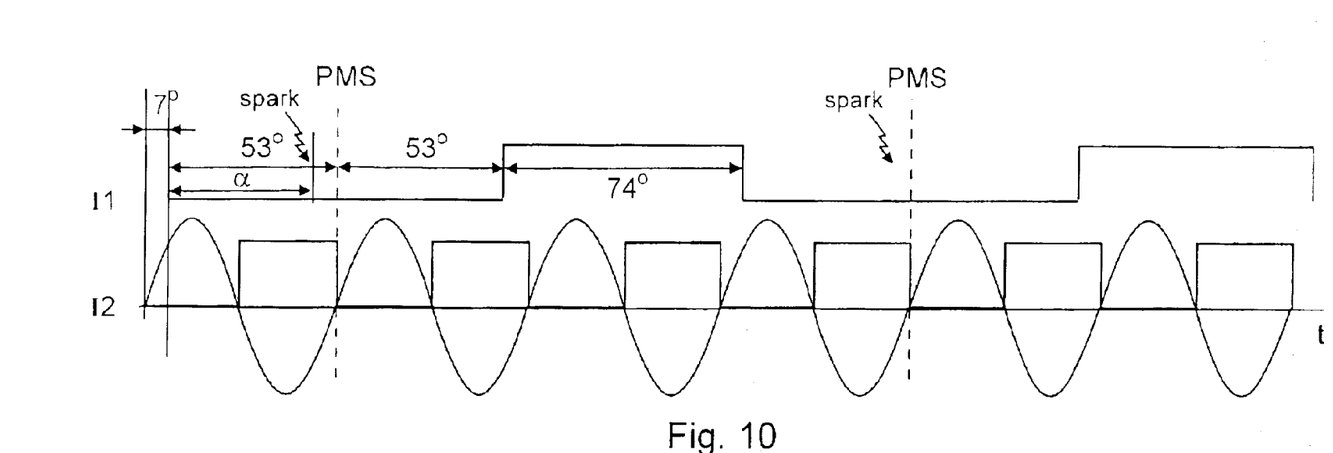
FIG. 10 shows the diagram of the binary signals correlated to the state of the magnetic sensor and to the output of the voltage generator, whenever the engine rotates in one direction.

Referring to FIG. 10 which shows the diagrams relating to a forward rotation of the engine, the following observations can be made:
 the negative fronts of the signal I1 correspond to an angular position which advances by 53° the TDC of one of the cylinders of the engine, for example the cylinder C1;
 the positive fronts of the signal I1 correspond to an angular position which is delayed by 53° with respect to the TDC of cylinder C1 referred to in the preceding point;
 the first negative front of the signal I2 which follows a negative front of the signal I1 corresponds to an angular negative front of the rotor which coincides with the TDC of the piston P1 of the cylinder C1 of reference;
 it is obvious that the microprocessor 15 programmed to recognize these events, will also be able to easily obtain the speed of rotation by measuring the time elapsed between two of the events described above.

Figure 11:
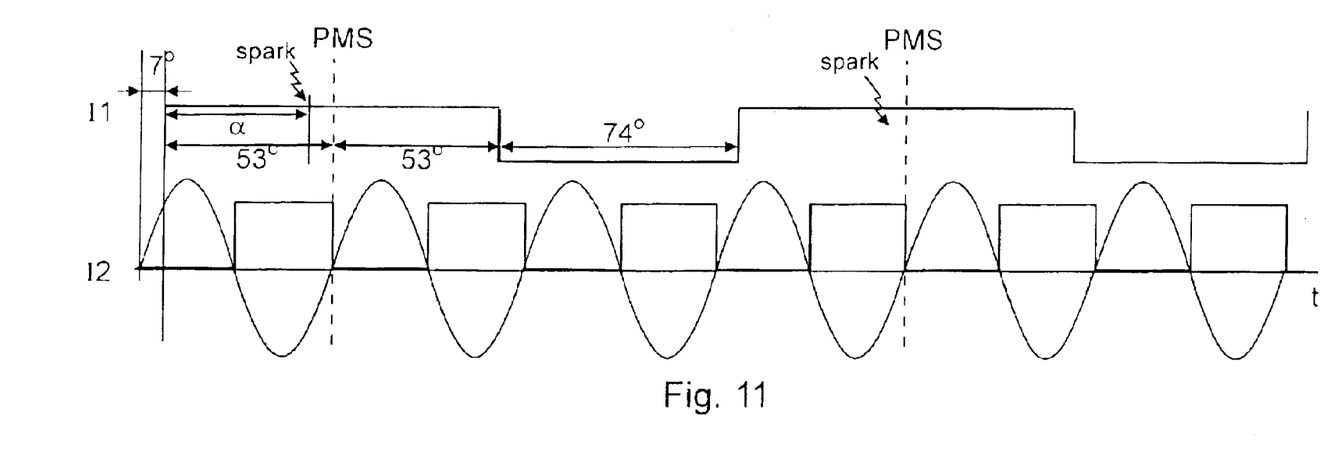
FIG. 11 shows the diagram of the binary signals correlated to the state of the magnetic sensor and to the output of the voltage generator, whenever the engine rotates in the opposite direction to that of the preceding figure.

Referring to FIG. 11 which shows the diagrams relating to a reverse rotation of the engine, the following observations can be made:
 the positive fronts of the signal I1 correspond to an angular position which advances by 53° the TDC of the reference cylinder C1;
 the negative fronts of the signal I1 correspond to an angular position which is delayed by 53° with respect to the TDC of the aforesaid reference cylinder;
 the first negative front of the signal I2 which follows a positive front of the signal I1 corresponds to an angular position of the rotor which coincides with the TDC of the piston P1 of the reference cylinder C1;
 it is evident also in this case that the microprocessor 15 programmed to recognize these events, will also be able to easily obtain the speed of rotation by measuring the time elapsed between the two events described above.

On observing the diagrams of FIGS. 10 and 11 again, it can be seen that, in the case of forward rotation, the negative fronts of the signal I1 always occur when the signal I2 is low, and the positive fronts of the signal I1 always occur when the signal I2 is high, while in the case of reverse rotation the positive fronts of the signal I1 always occur when the signal I2 is low, and the negative fronts of the signal I1 always occur when the signal I2 is high.

It is extremely simple, therefore, by means of a suitable control program carried out by the microprocessor 15, using this criterion, to determine the effective direction of rotation of the engine.

It can be observed that, since it is able to recognize events associable with angular positions sufficiently advanced with respect to the TDC, the programme carried out by the control microprocessor 15 can control the spark advance, defining a suitable delay corresponding to a certain phase angle indicated in FIGS. 10 and 11 by α in both directions of rotation; having the possibility of identifying events corresponding to positions close to the TDC it is possible to trigger the ignition in a suitable defined position even whenever, due to the cyclic irregularity of the engine, it is not possible to have the necessary precision in establishing a correspondence between arcs and times, all this in both directions of rotation; it is also possible to immediately identify the direction rotation with the utmost certainty, all this with the use of a single sensor, by the simple expedient of suitable timing of the sensor 7 and the relevant apertures 8 for activation of the latter, both with respect to the working cycle of the engine and with respect to the signal for supplying the ignition circuit with power from the generator.

The use of conventional systems or systems known from the prior documents does not lead to the attainment of these results, or in any case leads to less reliable results by the use of more than one sensor, due both to the intrinsic characteristics of the sensors used, and to the fact that at extremely low speeds or around the moment of reversal, the algorithms based on the correspondence between arcs and angles become critical, leading to the production of systems which under certain conditions may be functionally efficient, but are undoubtedly more expensive and more critical as regards their setting.

All this is obviated by means of the apparatus according to this invention which contemplates the use of a single bistable magnetic sensor, activated by the flux of the same magnetic field as the voltage generator, and due to the symmetry of the magnetic system with respect to the cycle of the engine which contemplates, in the position of the rotor corresponding to the TDC of the pistons, a central position of the magnetic probe 3 with respect to the two holes 8A and 8B or 8C and 8D provided for activating the sensor, and the positioning of the magnetization axis of the magnets of the rotor in correspondence with the axes of the stator spokes.

The system described previously by means of which the apparatus according to this invention is capable of establishing the direction of rotation of the engine, serves essentially to determine whether the reversal procedure of the engine has been successful or unsuccessful, in which case the microprocessor 15 can actuate further attempts or abandon the reversal, continuing to control the ignition in the current direction depending upon whether determined conditions occur or not, such as the detection of an excessively low speed of rotation, or the failure of a pre-established number of attempts.

Figure 12:
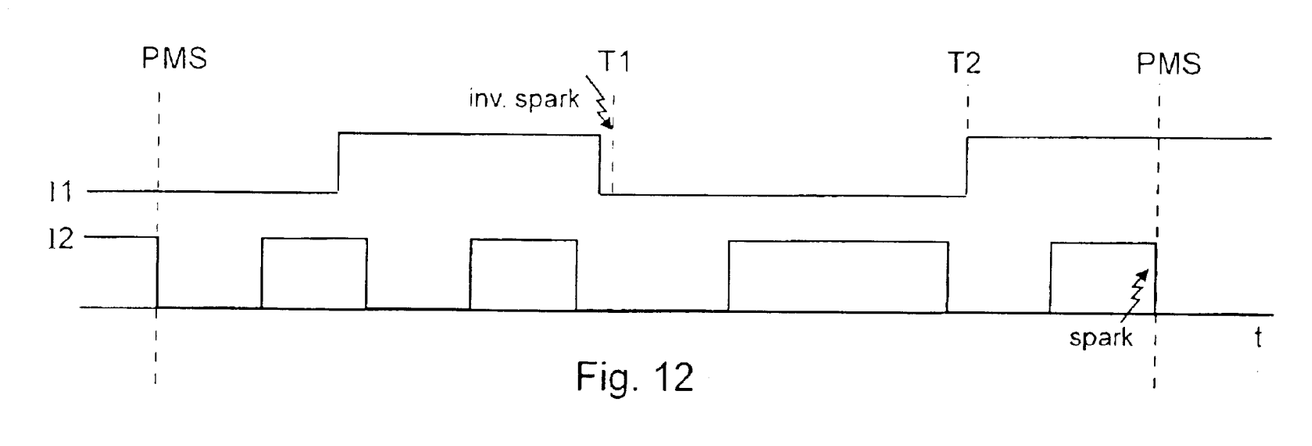
FIG. 12 shows a diagram representing the signals of the previous figures in the event of an attempt at reversal being successful.

FIG. 12 shows the evolutions in the time of the binary signals I1 and I2 correlated respectively to the output of the magnetic sensor 7 and to the voltage Vg generated by the stator winding 3 designed to supply power to the ignition circuit, correspondingly to a reversal manoeuvre successfully carried out from a condition of forward rotation to a condition of reverse rotation; it can be observed that following the reversal spark triggered at the instant T1, and therefore in advance with respect to the TDC of the piston P2 (it should be borne in mind that in the example in question the negative front of the signal I1 which precedes T1 is advanced by 53 degrees with respect to the TDC of the cylinder C2), the subsequent positive front of the signal I1 is detected at the instant T2 when the signal I2 is low; this condition indicates that the reversal has taken place correctly and that the system must therefore strike the next spark on the next negative front of the signal I2 close to the TDC of the cylinder C1, starting the correct control of the ignition in the reverse direction.

Figure 13:
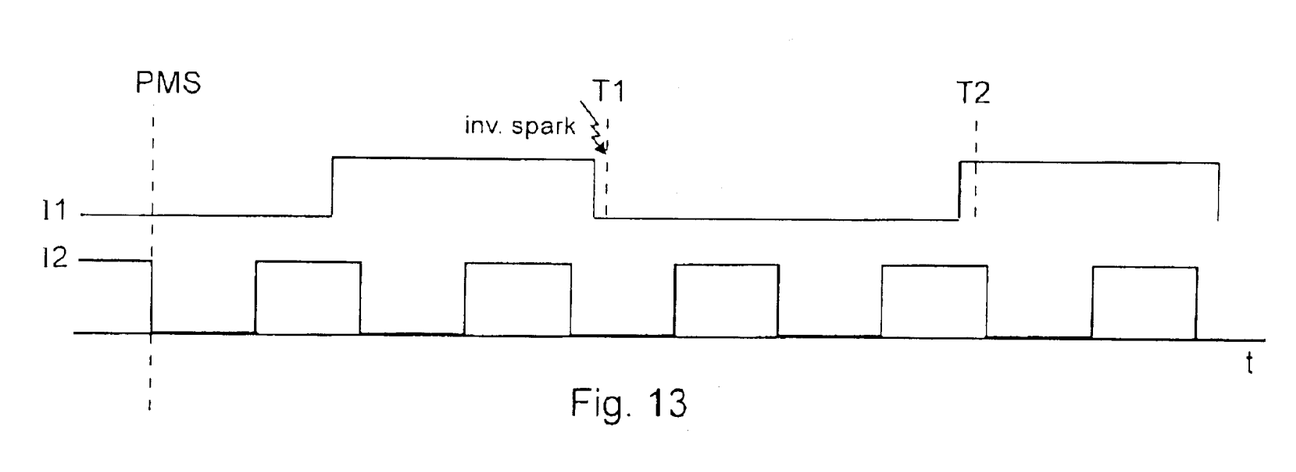
FIG. 13 shows a diagram representing the signals of the previous figures in the event of an attempt at reversal being unsuccessful.

FIG. 13 shows the evolutions in the time of the binary signals I1 and I2 correlated respectively to the output of the magnetic sensor 7 and to the voltage Vg generated by the stator winding 3 designed to supply power to the ignition circuit, correspondingly to an unsuccessful attempt at reversal while the engine is rotating in a forward direction; it can be observed that following the reversal spark triggered at the instant T1, and therefore in advance with respect to the TDC of the piston P2 (it should again be borne in mind that the negative front of the signal I1 which precedes T1 is advanced by 53 degrees with respect to the TDC of the cylinder C2), the subsequent positive front of the signal I1 is detected at the instant T2 when the signal I2 is high; this condition indicates that the reversal has not taken place and that the system must therefore decide whether to strike the next spark with a certain delay with respect to the subsequent negative front of the signal I1 to carry out a further attempt at reversal, or upon occurrence of the first negative front of the signal I2 which follows the negative front of the signal I1 to spark close to the TDC of the cylinder C1, continuing the correct control of the ignition in the forward direction.

A description will now be given of how the apparatus according to this invention carries out the manoeuvre which leads to the reversal rotation of the engine:

while keeping the engine running at minimum rpm, operating the INV control the timing of the ignition sparking controlled in a programmed way by the microprocessor 15 is first modified to obtain a reduction in the speed of rotation. In particular, in this phase a certain delay is contemplated in the sparking with respect to the TDC of the pistons of the engine that is to say when the piston has already started its downstroke; this manoeuvre involves a reduction of the energy available for powering the rotation of the engine thereby causing it to slow down;

when the speed of rotation, following the manoeuvre described above, is sufficiently low, or lower than a given threshold appropriately programmed in the electronic control unit, an ignition spark will be generated, considerably in advance with respect to the TDC of a piston, which, by activating the combustion considerably in advance with respect to the optimal timing for the normal operation of the engine, that is to say when the piston is rising and has not yet reached the normal advanced position with respect to the TDC of the piston itself, for example with an advance ranging from 20° to 60°, will develop a high pressure during the compression phase leading to a negative work aimed at reversal of the direction of rotation, before the piston reaches its TDC;

after having generated the spark aimed at the reversal, as described in the preceding point, the system will check the outcome of the attempt at reversal by processing the binary signals I1 and I2 at the outputs of the microprocessor 15 to determine the direction of rotation of the engine as described previously: if the attempt at reversal has been successful, the system takes care of the correct control of the ignition in the new direction of rotation, and the reversing operation is considered to have been completed; if, on the contrary, the failure of said attempt at reversal is recognized, the system is capable of controlling a certain number of further attempts before abandoning the reversing operation, continuing the normal control of the ignition in the current direction.

As part of the apparatus according to this invention, is the unit identified by the block 10 in FIGS. 1 and 7 designed to control the inputs and outputs of the system, which are aimed at interacting with the user or driver of the vehicle; this unit integrates or is connected to all the inputs and outputs involved in the interaction of the system with the user which are contemplated by the specific application; in particular, FIG. 7 shows the reversing control button INV and the acoustic reverse rotation indicator 26 in that they are the only devices of this type directly involved in the description of this invention.

The unit 10 of FIG. 1 is described in greater detail in FIG. 7 which shows the microprocessor 25 suitably programmed for communicating through an interface circuit 24, by means of the serial communication line S, and the interface 23, with the unit 5 for controlling the ignition, as well as for monitoring the state of activation of the buttons INV and of the switches 28 integrated in the device 10 or otherwise connected thereto, to send, through the communication line S, suitable messages to the microprocessor 15 of the control unit, and programmed to receive information from the unit 5 relating to its operative condition and for controlling the displays, indicators or more in general the outputs associated with the operative condition of the ignition system.

The diagram in FIG. 7 also shows the block 27 representing a circuit which supplies power to the unit 10 for interaction with the driver, and any optical or acoustic indicators controlled by the latter, obtaining the necessary energy from the winding 4 designed to supply power to the lighting system and the auxiliary equipment.

In order to consider the aims of this solution within the field of application of motor vehicles for which this invention is intended, we should like to premise a few remarks of a general nature relating to the applications of reference:

the type of application makes it extremely important for the ignition control unit to be extremely lightweight and compact;

it is important for the connections contemplated in the area of the engine compartment to be airtight or with a high degree of protection against environmental agents such as splashes of water, dirt and various chemical agents;

the devices intended for controlling the engine, such as phase sensors or other sensors designed to increase the accuracy and efficiency of the ignition control, such as temperature sensors, fuel supply throttle valve position sensors or knock sensors, are always positioned in the engine compartment and consequently close to the ignition control unit which, as in our case, also integrates the ignition coil, is positioned close to the sparking plugs; the switches, buttons and any optical or acoustic indicators or indicators displaying the operative parameters of the ignition designed for interaction of the system with the driver are obviously positioned close to the driver;

the acoustic and optical indicators and in general the display devices involve electrical inputs comparable and sometimes much higher than the typical inputs of even the most sophisticated ignition circuit.

In the light of the preceding observations, it is clear that the solution proposed according to this invention, in addition to solving the problem relating to the supply of power to the outputs (light bulbs, displays or acoustic indicators) in that the winding 5 designed to supply power to the lighting system and the auxiliary equipment provides a source of power fully sufficient for this purpose, also permits considerable rationalization and simplification of the cabling of the system, which results in a significant reduction of costs.

It can also be seen that the modularity thus introduced permits greater economies of scale and simplification of production management in the event of the range of applications contemplating more or less complex configurations of the devices for interaction with the driver.

From what has been described, it will be evident that the invention is addressed to a method and to an electronic apparatus for reversal of the direction of rotation of an internal combustion engine as defined; the invention is also addressed to a kit for outfitting an internal combustion engine by means of an electronic apparatus for reversal of the direction of rotation of the engine comprising a microprocessor control unit, programmed to control the ignition phase both during forward rotation, and during reverse rotation, as well as for controlling the rotation reversal process, on the basis of information obtained from a first binary signal emitted by a bistable magnetic sensor activated by the magnetic flux of the generator, and by a second binary signal correlated to the voltage of the generator: the direction of rotation is made to reverse by introducing a delay in the ignition, and subsequently generating an advanced spark while the engine is still rotating in the original direction; this solution enables the apparatus to be initially applied without the microprocessor-controlled unit 10 for controlling the inputs and outputs of the electronic control unit 5, as in a normal ignition system. The microprocessor-controlled unit 10, for controlling the reversal of the engine, can also be applied subsequently.

What we claim is:

1. Method for reversing the rotation of a two-stoke internal combustion engine having a voltage generator to generate an alternate voltage having different polarities for an ignition circuit, and an electronic control apparatus comprising a microprocessor unit for controlling the alternate voltage supplied to said ignition circuit, in which the reversal of rotation is performed after a reduction of the rotational speed of the engine, comprising the steps of:

providing said control apparatus) with a bistable sensor having first and second conductive states, and cyclically switching the sensor between said first and second states during the rotation of the engine;

generating a first binary signal having first and second operative levels correlated to said first and second conductive states of the bistable sensor;

generating a second binary signal having first and second operative levels correlated to the polarities of the alternate voltage supplied to the ignition circuit;

detecting speed and direction of rotation of the engine, on the basis of information obtained by the microprocessor control unit from said first and second binary signals;

slowing down the speed of rotation of the engine while it is still rotating in the detected direction, by delaying the sparking of the ignition circuit with respect to a top dead centre of the engine; and effecting a reversal of rotation of the engine by sparking in advance, with respect to said top dead centre of the engine.

2. Method according to claim 1, comprising the step of slowing down the rotation by delaying the ignition of the engine, with respect to the top dead centre, by changing the extent of the ignition delay according to a deceleration procedure programmed in said microprocessor control unit.

3. Method according to claim 1, comprising the step of recognizing, by means of said microprocessor control unit, the reversal rotation event of the engine on the basis of information derived from said first and said second binary signals, and continuing a normal control of the ignition sparks to maintain the reversed direction of rotation of the engine.

4. Method according to claim 3, comprising the step of recognizing the reversal rotation of the engine in relation to a low condition of the binary signal correlated to the voltage of the generator, in correspondence with the first positive front of the binary signal emitted by the bistable sensor, following the triggering of a reversal spark.

5. Method according to claim 1, comprising the step of recognizing, by means of said microprocessor control unit, an unsuccessful reversal rotation of the engine on the basis of information derived from said first and said second binary signals, and causing the repetition of at least a second rotation reversal phase.

6. Method according to claim 5, comprising the step of detecting an unsuccessful reversal of rotation in relation to the binary signal correlated to the voltage of the generator, and of the first positive front of the binary signal emitted by the bistable sensor, following the triggering of a reversal spark.

7. Method according to claim 1 in which the voltage generator comprises a stator winding and a permanent magnet rotor for providing a magnetic excitation field, wherein said first binary signal is generated by a bistable magnetic sensor cyclically switched into its first and second conductive states by the magnetic field of the same rotor.

8. Method according to claim 7, according to which the voltage generator comprises a cup shaped rotor having a peripheral wall, wherein the bistable magnetic sensor is switched into its first and second conductive states by magnetic fluxes of opposite polarities, through angularly spaced apart apertures in the peripheral wall of the rotor.

9. Electronic apparatus for reversal of rotation of an internal combustion engine having at least one two-stroke cylinder-piston unit, comprising:
an engine ignition circuit;
a voltage generator having a permanent magnet rotor and a stator provided with a winding for generating an alternate voltage for powering the ignition circuit;
means for supplying phase signals correlated to the direction and speed of rotation of the engine; and
a microprocessor control unit, for controlling the sparking phases of the ignition circuit and for effecting a reversal of rotation of the engine,
the apparatus comprising:
a bistable sensor having first and second conductive states, said bistable sensor being cyclically activable during the rotation of the engine for the generation of a first binary signal correlated to said first and second conductive states;
a circuit for generating a second binary signal correlated to the polarities of the alternate voltage for the ignition circuit;
the microprocessor control unit comprising signal inlets fed with said first and second binary signals, said control unit being programmed for determining speed and direction of rotation of the engine, and for controlling the ignition of the engine during forward and reverse rotation, and for slowing down and reversing the rotation of the engine on the basis of information obtained from said first and second binary signals.

10. Apparatus according to claim 9, wherein said bistable sensor comprises a magnetic probe activated by the magnetic field of the voltage generator.

11. Apparatus according to claim 10, wherein said magnetic sensor comprises a bistable Hall probe.

12. Apparatus according to claim 9, wherein said microprocessor control unit is programmed for determining the rotational direction of the engine in relation to the states of said second binary signal and in correspondence with the upward and downward fronts of the first binary signal.

13. Apparatus according to claim 9, in which said bistable sensor comprises a magnetic sensor activated by a magnetic flux of the voltage generator, and in which the rotor of the voltage generator comprises a peripheral wall for supporting a plurality of radially polarized magnets having alternate poles of opposite polarities, wherein the rotor comprises at least a first and a second flux circulation means for flux circulation towards the sensor alignable with oppositely polarized magnets angularly spaced apart on the peripheral wall of the rotor.

14. Apparatus according to claim 13, wherein said flux circulation means comprise angularly spaced apart apertures on the peripheral wall of the rotor.

15. Apparatus according to claim 14, wherein said apertures for the magnetic flux extend in the direction of the rotational axis of the rotor.

16. Apparatus according to claim 13, wherein said first and second flux circulation means are arranged on the peripheral wall of the rotor in a symmetrical position with respect to the magnetic sensor, in the top dead centre condition of a piston of the engine.

17. Apparatus according to claim 16, wherein said first and second flux circulation means are disposed at an angular space ranging from 40° to 60°.

18. Apparatus according to claim 9, in which said bistable magnetic sensor comprises an inlet and an outlet for a control signal correlated to the first and second conductive states of the sensor, wherein a resistive circuit is shunted between said inlet and outlet of the sensor, and in that the inlet and the outlet of the sensor are connected to a voltage power source respectively to a voltage comparator for the generation of said first binary signal, by means of a single conductor.

19. Apparatus according to claim 9, wherein the axes of the magnetic poles of the stator, are positioned so that the zero crossing of the alternate voltage fed to the ignition circuit, corresponds to the angular positions of the magnetic poles of the rotor, in correspondence of the top dead centre of a piston of a cylinder of the engine.

20. Apparatus according to claim 9, wherein comprising a micro-controller for the managing of the inlet and outlet interacting with a user, connected to the ignition control unit.

21. Apparatus according to claim 20, wherein said microcontroller is connected to the ignition control unit by a serial connection channel.

22. Apparatus according to claim 9, wherein said ignition control unit is programmed for generating a spark for the reversal of the rotation, having an advance ranging from 20° to 60°, with respect to the top dead centre of the engine.

23. A rotation reversal kit for retrofitting an internal combustion engine having at least one two-stroke cylinder-piston unit, the kit comprising:
an engine ignition circuit;
a voltage generator having a permanent magnet rotor and a stator provided with a winding for generating a voltage for feeding the ignition circuit;
means for supplying a phase signal correlated to the direction and speed of rotation of the engine;
a microprocessor-control unit for controlling the sparking phases of the ignition circuit and for effecting a reversal of rotation of the engine;
a bistable sensor cyclically activable during the rotation of the engine, to provide the generation of a first binary signal correlated to conductive states of the sensor;
a control circuit for generating a second binary signal correlated to the polarities of the feeding voltage for the ignition circuit;
and in which the microprocessor control unit is provided with said first and second binary signals and is programmed for detecting the speed and direction of rotation, as well as for controlling the sparking of the engine, during forward rotation and reverse rotation, and for slowing down and reversing the rotation of the engine on the basis of information obtained from said first and second binary signal provided by the bistable sensor and said control circuit.

* * * * *